(12) United States Patent
Barnett (10) Patent No.: US 6,173,419 B1
(45) Date of Patent: Jan. 9, 2001

(54) FIELD PROGRAMMABLE GATE ARRAY (FPGA) EMULATOR FOR DEBUGGING SOFTWARE

(75) Inventor: Philip C. Barnett, Clanfield (GB)

(73) Assignee: Advanced Technology Materials, Inc., Danbury, CT (US)

(*) Notice: Under 35 U.S.C. 154(b), the term of this patent shall be extended for 0 days.

(21) Appl. No.: 09/078,872

(22) Filed: May 14, 1998

(51) Int. Cl.⁷ ........................................ G06F 11/00
(52) U.S. Cl. ........................................ 714/28; 717/4
(58) Field of Search .................... 395/702, 704; 716/17; 714/28, 29, 30, 31, 38; 717/2, 4, 39, 46

(56) References Cited

U.S. PATENT DOCUMENTS

| 4,674,089 | 6/1987 | Poret et al. ........................ 371/25 |
| 5,228,039 | 7/1993 | Knoke et al. ...................... 371/19 |
| 5,313,618 | * 5/1994 | Pawloski ........................... 714/28 |
| 5,325,365 | 6/1994 | Moore et al. ..................... 371/16.2 |
| 5,537,536 | * 7/1996 | Groves ............................. 714/28 |
| 5,541,862 | 7/1996 | Bright et al. ..................... 364/580 |
| 5,590,354 | * 12/1996 | Klapproth et al. ................ 714/30 |
| 5,603,043 | 2/1997 | Taylor et al. ..................... 395/800 |
| 5,604,888 | 2/1997 | Kiani-Shabestari et al. ..... 395/500 |
| 5,640,337 | 6/1997 | Huang et al. ..................... 364/578 |
| 5,657,441 | 8/1997 | Kurose et al. ................... 395/183.04 |
| 5,664,198 | 9/1997 | Chen et al. ....................... 395/733 |
| 5,670,897 | 9/1997 | Kean et al. ....................... 326/41 |
| 5,903,718 | * 5/1999 | Marik ............................... 714/38 |
| 5,911,059 | * 6/1999 | Profit, Jr. ......................... 395/500 |

* cited by examiner

Primary Examiner—Robert W. Beausoliel, Jr.
Assistant Examiner—Pierre E. Elisca
(74) Attorney, Agent, or Firm—Oliver A. Zitzmann; David G. Rasmussen (57) ABSTRACT

An emulator is used to debug software operating on a target micro-controller in a target circuit environment. The emulator contains a field programmable gate array that is programmed to contain an emulated target micro-controller and an emulated monitoring circuit which monitors the operations of the micro-controller. The emulated target micro-controller receives signals from the target circuit environment. The signals from the target circuit environment are communicated to the emulated target micro-controller by one or more channels, such as a data channel and a timing channel. The number of channels is limited so that signals from the target environment do not degrade the performance of the emulator. A host computer contains a software debug program which works with the emulated monitoring circuit to monitor the emulated micro-controller. The FIELD PROGRAMMABLE GATE ARRAY is programmed to have the characteristics of one or more types of memory, for example ROM, PROM and EEPROM to emulate the different types of memory.

32 Claims, 9 Drawing Sheets

FIG.3b BOTTOM VIEW OF PROBE

FIELD PROGRAMMABLE GATE ARRAY (FPGA) EMULATOR FOR DEBUGGING SOFTWARE

BACKGROUND OF THE INVENTION

1. Field of the Invention

The present invention relates to an emulator for debugging software that operates on a target micro-controller in a target circuit environment. More specifically, the invention relates to the emulator being programmed into a field programmable gate array (FPGA).

2. Description of the Related Art

An example of a generic micro-controller is the industry standard 8051 originally designed by Intel. New software for different applications of the 8051 is constantly being written and must be debugged.

There are currently two conventional hardware techniques used by programmers to debug computer software code. These techniques include program monitors and microprocessor emulators.

With a program monitor the software debugging is done on the target micro-controller. The program monitor is intrusive software located in code RAM with the operating program that controls the functions of the micro-controller. The program monitor operates in conjunction with and monitors the operation of the operating program. A programmer uses the program monitor to send his own instructions to the micro-controller when it is code fetching and he is able to make the micro-controller interrogate itself. Not all signals in the micro-controller are available to the programmer so the amount of control is limited.

The use of program monitors is advantageous because they are relatively inexpensive and find the majority of errors or "bugs" located in the main program. One drawback of program monitors is that they require the use of resources in the target circuit and typically are ineffective in detecting more difficult problems in the associated program code.

The second type of software debugging tool is an emulator that substitutes for the target micro-controller during target circuit testing and execution. The emulator is non-intrusive and contains a micro-controller and debugging software. A host computer operates in conjunction with the emulator to provide transparent operation of the emulator micro-controller embedded in the target circuit. The emulator traces all activity that occurs at the micro-controller. The emulator provides a complex breakpoint system that monitors the micro-controller activity and stops the micro-controller operations at predetermined points for analysis of certain target circuit signals. The emulator is designed for use primarily in full system integration and for solving real-time problems.

An advanced version of an emulator has a micro-controller and monitoring logic integrated into a bondout integrated circuit. The bondout IC contains monitoring or debug circuitry which provides a window into the operations of the micro-controller. The bondout IC replaces the target micro-controller in the target circuitry. A host computer has a commercially available software debug program which works with the monitoring circuitry to look at the response of the micro-controller as instructions are executed from the program being debugged. The emulator is designed for use primarily in full system integration and for solving real-time problems.

This performance, however, comes at a price. The bondout IC is typically a low volume more complex version of the production device. Thus, one major drawback of emulators is that they are relatively expensive, thereby making them inaccessible to a significant percentage of the growing number of software engineers participating in micro-controller-based circuit design tasks.

What is needed is an emulator for debugging software that operates in real time, is economical to create, and may be programmed to have a variety of configurations.

SUMMARY OF THE INVENTION

The present invention is an emulator for debugging software operating on a target micro-controller in a target circuit environment. The emulator contains a field programmable gate array that is programmed to contain an emulated target micro-controller and an emulated monitoring circuit which monitors the operations of the emulated micro-controller.

A host computer contains a source level program which contains the models for the emulated target micro-controller and the emulated monitoring circuit emulator. The host computer compiles the source level program and reads and configures it into the FPGA so that the emulated target micro-controller and the emulated monitoring circuit are programmed into the FPGA.

The emulated target micro-controller receives signals from the target circuit environment. The signals from the target circuit environment are communicated to the emulated target micro-controller by one or more channels, such as a data channel and a timing channel. The number of channels is limited so signals from the target environment do not degrade the performance of the emulator.

The host computer contains a software debug program that works with the emulated monitoring circuit to monitor the emulated micro-controller. A RAM contains the code store program that is used to provide instructions to the micro-controller.

The FPGA is programmed to have the characteristics of one or more types of memory, for example ROM, PROM and EEPROM. The FPGA cooperates with the RAM to emulate the different types of memory.

One novel feature of the invention is the programming of the emulated micro-controller and emulated monitoring circuit into the FPGA. The major advantage of this approach is that it allows the same general purpose hardware (i.e. FPGA and RAM) to be used in the emulation of different configurations of the micro-controller without any hardware modifications which reduces cost and speeds time to market. In addition, it enables the incorporation of additional logic for the monitoring circuit to speed the customers software debugging process without undermining the security of the target IC.

A second novel feature is that new and different memory technologies may be implemented (i.e. ROM, PROM, EEPROM) with the same hardware.

DETAILED DESCRIPTION OF THE INVENTION

Figure 1:
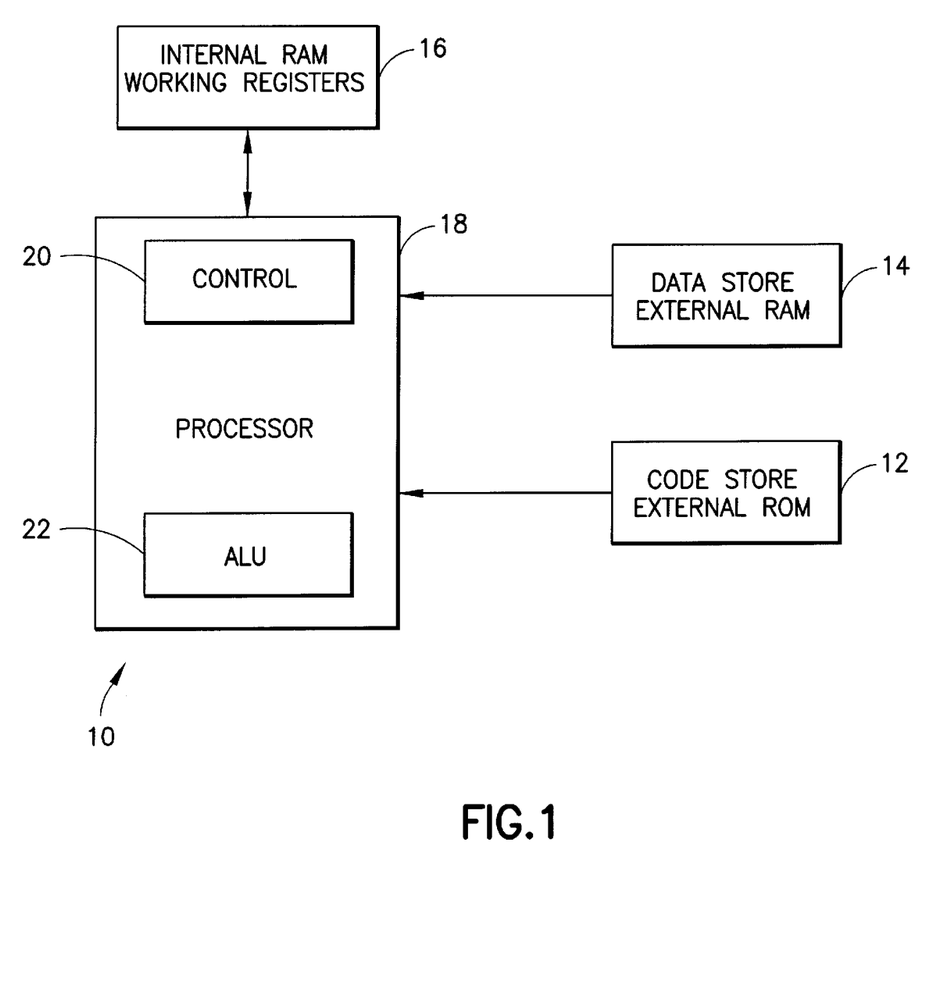
FIG. 1 is a block diagram of a micro-controller.

FIG. 1 shows a simplified diagram of a generic microcontroller 10, an example of which is the industry standard 8051 originally designed by Intel. Typically, it consists of a non-volatile code store 12 made up of external ROM (read only memory) that holds the controlling program. Once loaded this store never changes even when the power is removed. An external memory array of RAM, data store 14, is used to store temporary data. Working register stores 16 are internal RAM which hold data being manipulated by processor 18. In addition, the working registers 16 include peripheral registers which hold data characterizing peripherals such as I/O ports. Instructions for the processor 18 are read from the controlling program in code store 12. Processor 18 contains a control 20 and arithmetic logic unit (ALU) 22.

New software for different applications of the 8051 is constantly being written and must be debugged. There are currently two conventional hardware techniques used by programmers to debug computer software code. These techniques include program monitors and microprocessor emulators.

Figure 2:
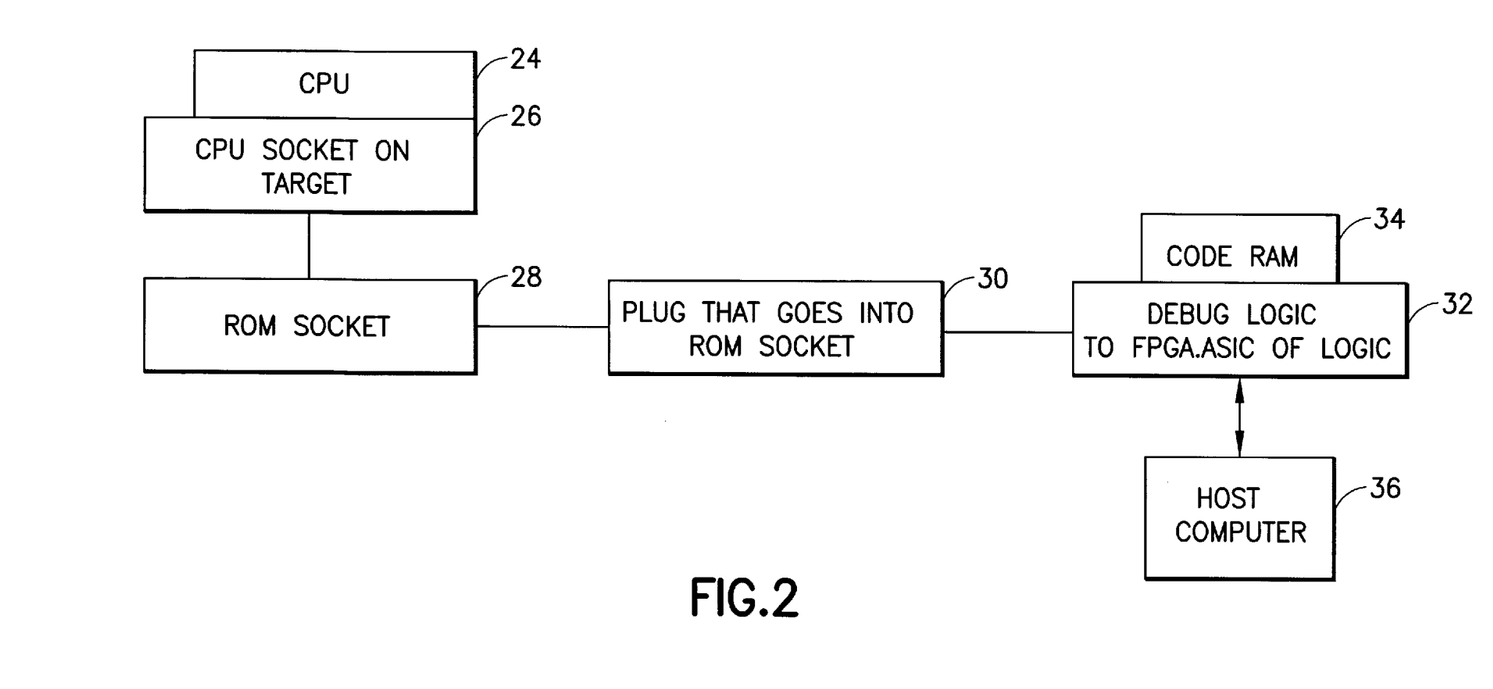
FIG. 2 is a schematic cross section of a program monitor.

With a program monitor as shown in FIG. 2, the debugging is done on the target microprocessor that the software is to operate on. In FIG. 2 a target CPU 24 is in a CPU socket 26 on the target circuit. A ROM socket 28 communicates with CPU socket 26 and CPU 24. ROM socket 28 receives a plug 30 that communicates with debug logic 32 in the form of an FPGA, ASIC or logic. Code RAM 34 provides code to CPU 24. The programmer may provide debug instructions to code RAM 34 via host computer 36. Thus, by the programmer sending his own instructions to the CPU when it is code fetching he can get it to interrogate itself. Not all signals in the CPU 24 are available to the programmer so the amount of control is limited.

A program monitor is intrusive software code located in code RAM 34 to debug computer programs. The program monitor operates in conjunction with and monitors the operation of a main computer program that controls the functions of the CPU 24. The program monitor code is intrusive in that it is linked to the main program code, both of which are downloaded into code RAM 34 used by the programmer. The use of a monitor program requires that a universal asynchronous receiver-transmitter or other communication hardware be provided in the target circuit so that the monitor can communicate apart from the main program to the programmer.

The use of program monitors is advantageous because they are relatively inexpensive and find the majority of errors or "bugs" located in the main program. One drawback of program monitors is that they require the use of resources in the target circuit and typically are ineffective in detecting more difficult problems in the associated program code.

The second type of software debugging occurs on an emulator that takes the place of the target microprocessor. An emulator is a non-intrusive software debugging tool that uses external hardware to provide transparent operation of a microprocessor embedded in a target circuit. The emulator microprocessor substitutes for the target microprocessor during target circuit testing and execution, and the emulator traces all activity that occurs at the target microprocessor. An emulator provides a complex breakpoint system that monitors the target microprocessor activity and stops the microprocessor operations at predetermined points for analysis of certain target circuit signals.

Figure 3A:
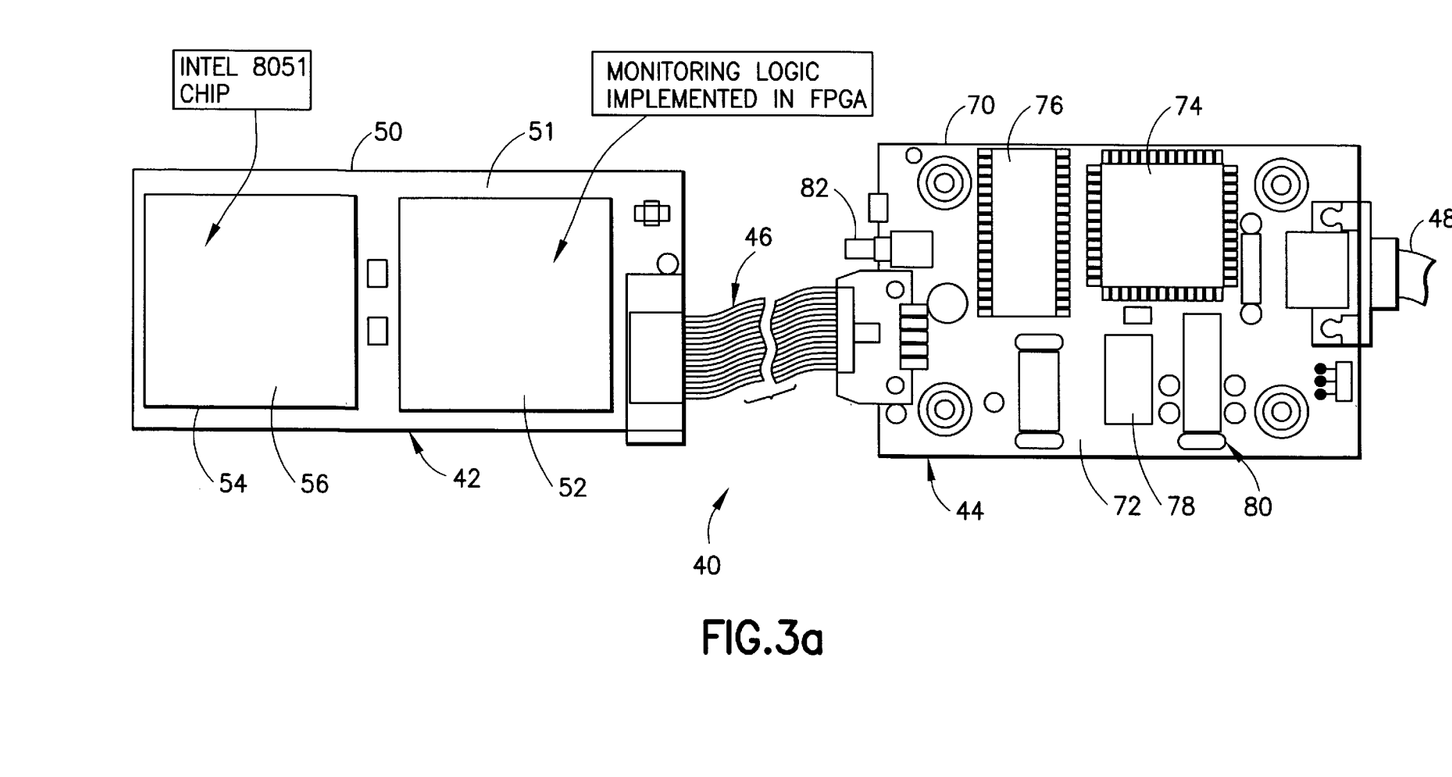
FIG. 3 shows the components of a micro-controller emulator.

Such an emulator is shown in FIG. 3 and disclosed in U.S. Pat. No. 5,228,039 hereby incorporated by reference. FIG. 3 is a pictorial view of an embodiment of a software code debugging instrument 40 which includes a target access probe ("TAP") subsystem 42 and a communications adapter ("COMDAP") subsystem 44 interconnected by a detachable flat cable assembly 46. COMDAP 44 receives command signals transmitted on an RS-232 serial communications link 48 from a host analysis code source or host computer (not shown) on which a fully integrated windowed debugging software program operates. Communications link 48 is preferably of the RS-232 type because standard computer terminals use a communications protocol defined by BA standard RS232 to send and receive data from a control computer. COMDAP 44 conditions the command signals for delivery through the conductors of cable assembly 46 to TAP 42.

Figure 3B:
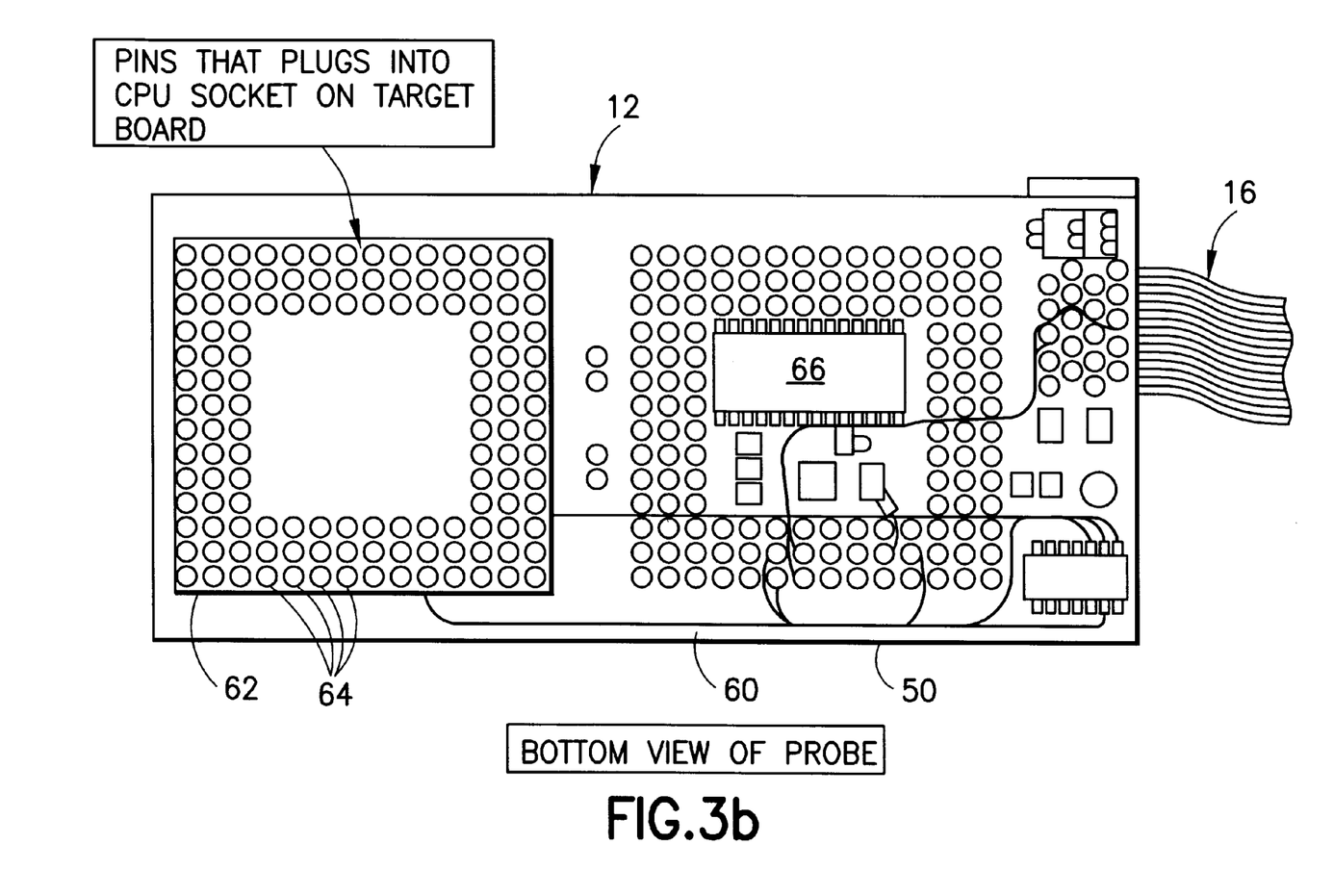

TAP 42 includes a printed circuit board 50 that carries on its upper surface 51 a first programmable logic cell array 52 having monitoring logic and a first socket 54 that receives the lead pins of a microprocessor or central processing unit ("CPU") 56. Printed circuit board 50 in FIG. 3b carries on its lower surface 60 a second socket 62 having multiple downwardly depending pins that connect by electrically conductive paths through circuit board 50 to the solder pads of socket 54 and can be inserted into a female target CPU socket on the target circuit board (not shown). Printed circuit board 50 also carries on its lower surface 60 a random access memory (RAM) 66. Programmable logic cell array 52, which is monitoring logic, establishes signal flow paths necessary to provide data and address signals in the proper digital word format to CPU 56 and RAM 66. CPU 56 substitutes for and plugs into the socket receptacles dedicated for a CPU on the target circuit board, and RAM 66 functions as the in-circuit emulation ("ICE") program memory for TAP 42 when it takes control of target circuit operation.

COMDAP 44 includes a printed circuit board 70 that carries on its upper surface 72 a second programmable logic cell array 74 and an erasable programmable read only memory ("EPROM") 76. COMDAP 44 also includes a 30 MHz crystal oscillator 78 and associated frequency divider circuitry 80 that provide clock signals to programmable logic cell arrays 52 and 74 to enable high-speed serial command and data transfer between TAP 42 and COMDAP 44 through cable assembly 46.

Figure 4:
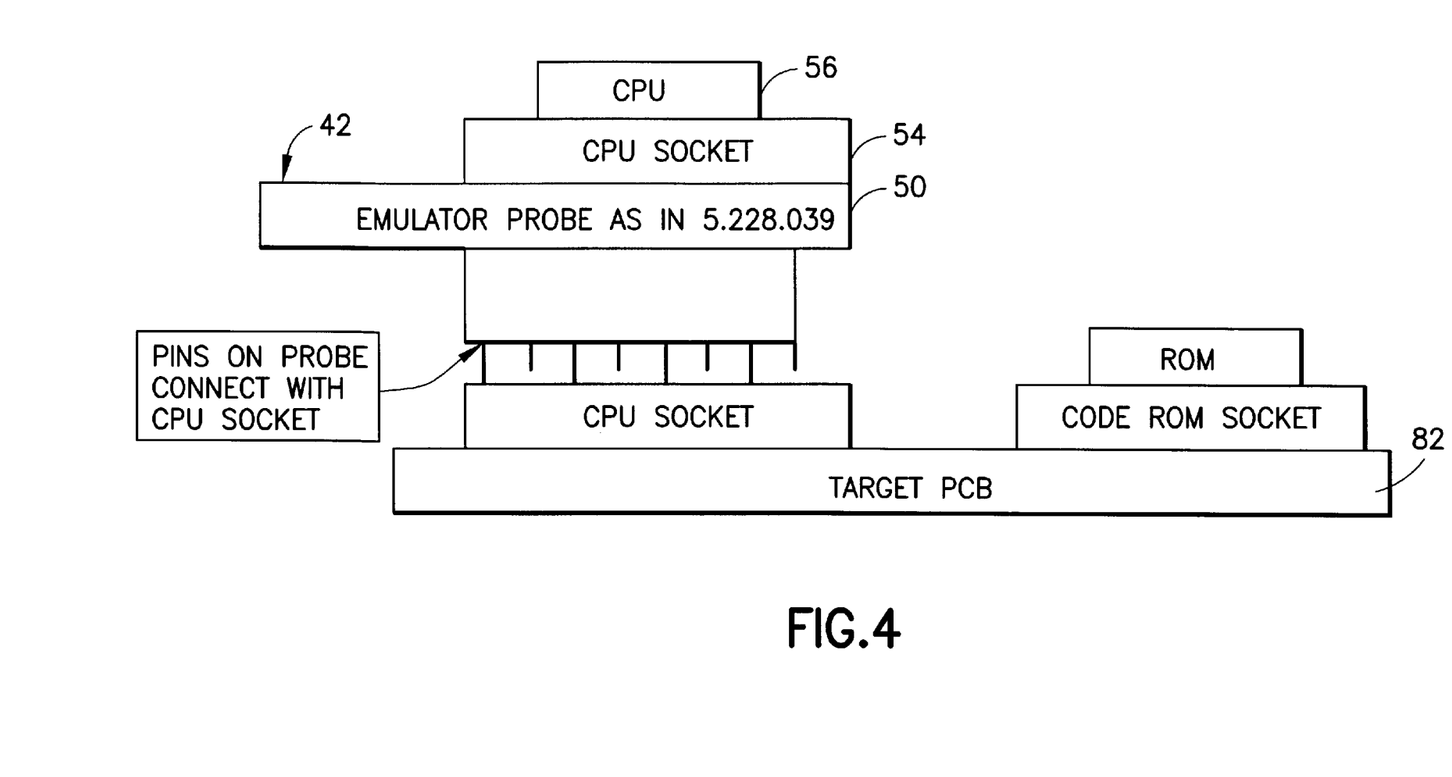
FIG. 4 shows a schematic cross section of the micro-controller emulator of FIG. 3.

FIG. 4 shows how the emulator of FIG. 3 is assembled. The target CPU would be removed from the target printed circuit board 82 and the TAP 42 containing printed circuit board 50 with CPU socket 54 and CPU 56 would be plugged into the empty CPU socket.

An emulator is designed for use primarily in full system integration and for solving real-time problems. A programmer using an emulator is able to replace the programmer's ancillary ROM with an overlay random access memory (RAM) located in the emulator. The overlay RAM allows the programmer to debug the program code even when the target circuit is not complete physically and thereby shortens the development time of microprocessor-embedded circuits. Certain types of emulators do not require the use of the target resources; therefore, such emulators can be viewed as non-intrusive code debugging instruments.

An emulator addresses the needs of the integration phase and time-dependent problems in a target circuit by using a trace feature, complex breakpoint systems, and an overlay memory. Because each of these features is expensive but critical for full system integration, such features are not necessary for run-time debugging.

Figure 5:
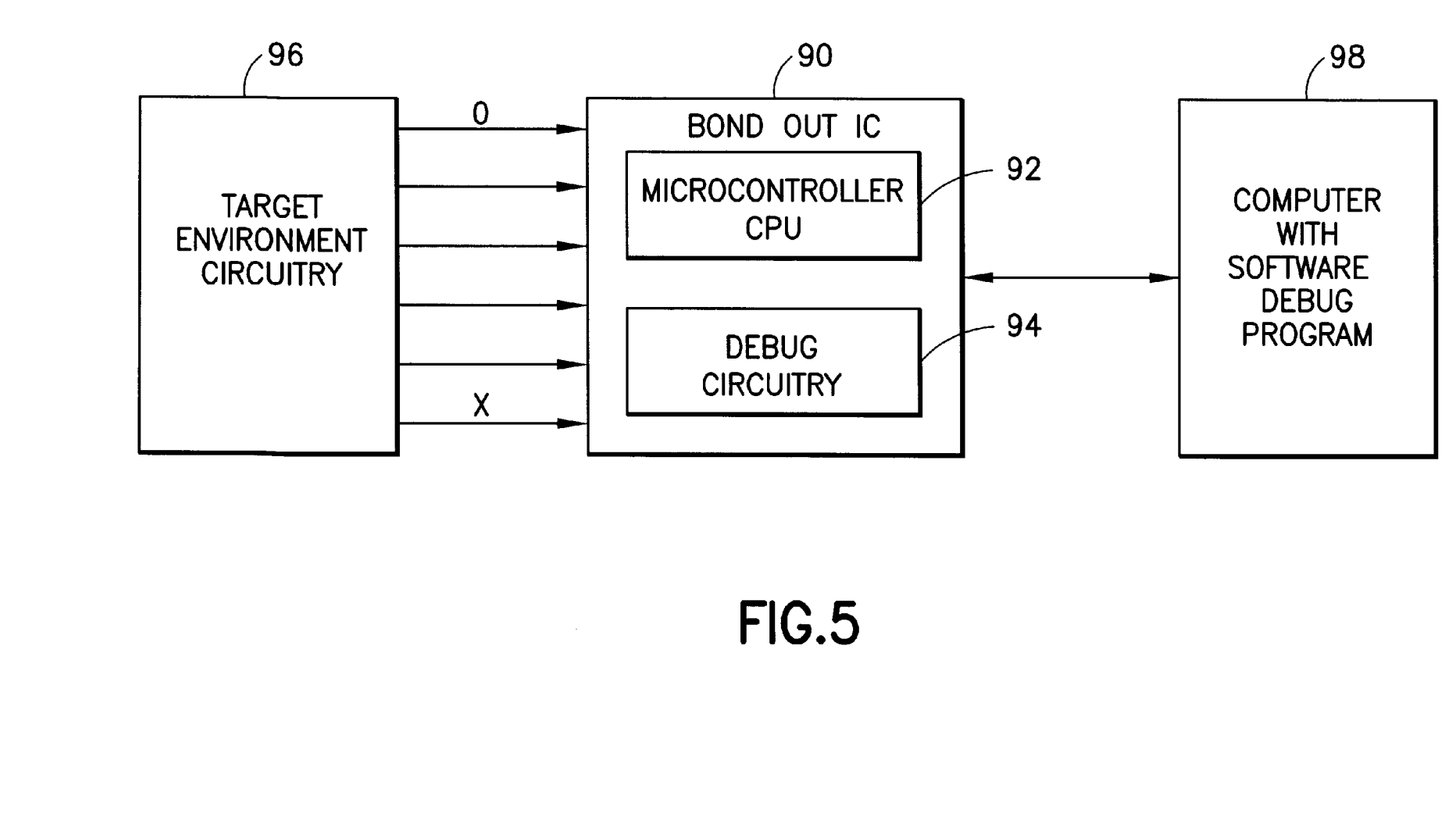
FIG. 5 shows a block diagram of the emulator of FIG. 4 using a bondout micro-controller.

FIG. 5 shows an advanced version of the emulator of FIGS. 3 and 4 with its CPU and monitoring logic integrated into a bondout integrated circuit IC 90. The bondout IC 90 contains a CPU or micro-controller 92 and monitoring or debug circuitry 94 which provides a window into the operations of the micro-controller. The bondout IC 90 replaces the target micro-controller in the target circuitry 96. A computer 98 has a commercially available software debug program which works with the debug circuitry 94 to look at the response of the micro-controller 92 as instructions are executed from the program being debugged. The target circuitry 96 may have a large number of signals as inputs to the micro-controller 92. Some may be synchronous where timing information is known and others may be asynchronous where they arrive randomly at micro-controller 52. The emulator is designed for use primarily in full system integration and for solving real-time problems. This performance, however, comes at a price. The bondout IC 50 is typically a low volume more complex version of the production device. Thus, one major drawback of emulators is that they are relatively expensive, thereby making them inaccessible to a significant percentage of the growing number of software engineers participating in microprocessor-based circuit design tasks.

Figure 6:
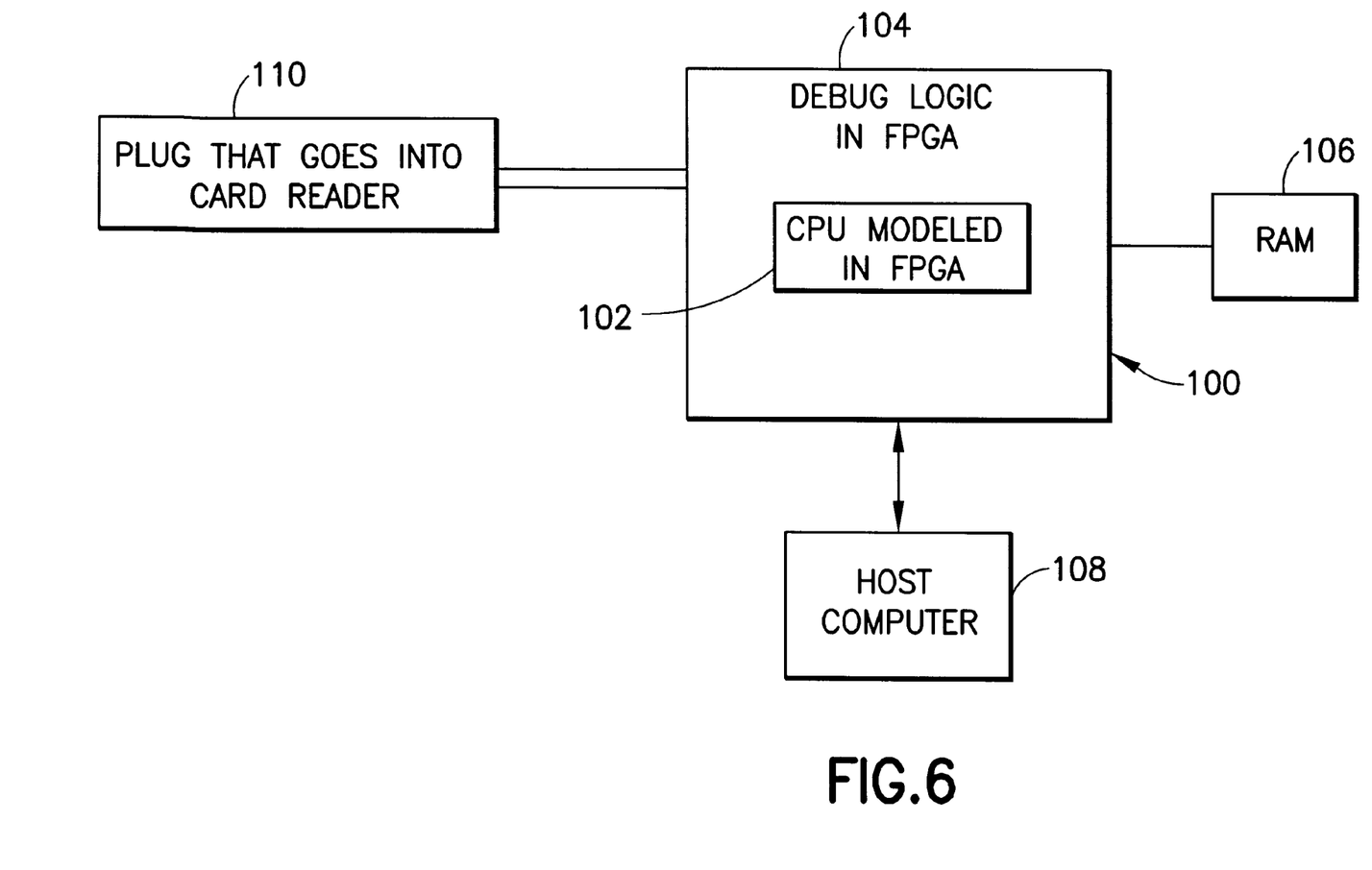
FIG. 6 is a block diagram of the emulator of the present invention programmed onto a field programmable gate array.

FIG. 6 is a functional block diagram showing the emulator for debugging software of the present invention. The emulator is programmed into a field programmable gate array (FPGA) which will work in real time, does not need to be fabricated as an expensive ASIC, and is programmable to other configurations.

The emulator, for example, may be used to emulate a micro-controller in a smart card. FPGA 100 is programmed with a model of a micro-controller 102 for example an 8051. In addition, FPGA 100 is programmed with a model of monitoring or debug logic 104 that gives the software engineer a fully transparent window into the internal functioning of modeled micro-controller 102. Ram 106 holds the code store that provides a program for operating the modeled micro-controller 102. In addition RAM 106 holds a data store for modeled micro-controller 102. A host computer 108 holds a debug program for debugging the code store software provided to micro-controller 102. Data inputs to the micro-controller 102 come from a plug 110 plugged into a card reader, which provides data and timing signals (not shown). Micro-controller 102 does not need to be plugged into a target environment, however, it is advantageous to receive signals from the target environment because actual signals from, for example, a keyboard may be different than the predicted signals because of timing or other factors.

Figure 7:
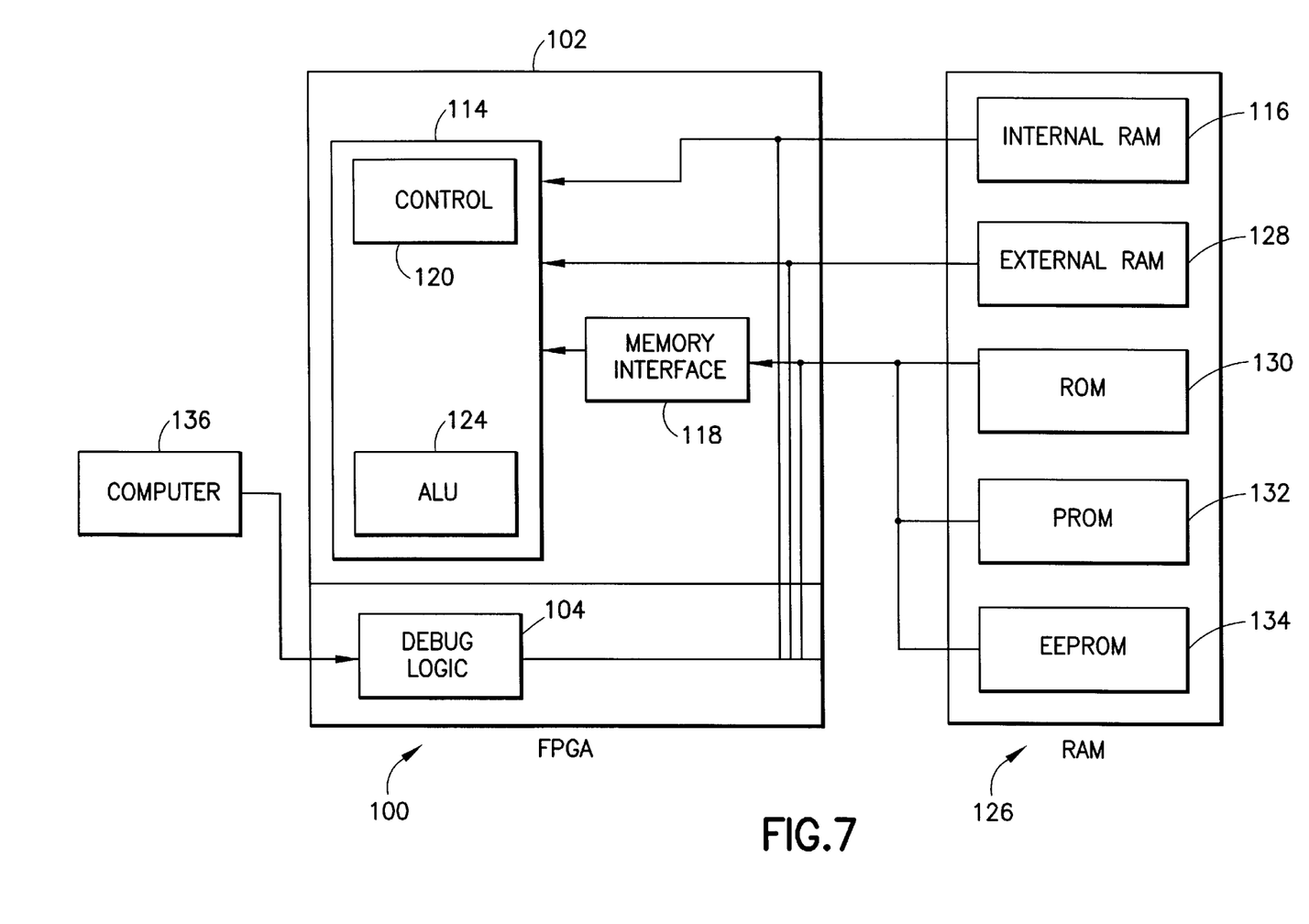
FIG. 7 is a detailed block diagram of the emulator of FIG. 6.

FIG. 7 shows the emulator of FIG. 6 in more detail. The emulator of FIG. 7 has a micro-controller 102, which may be any generic micro-controller, for example, the 8051 shown in FIG. 1. Micro-controller 102 includes a processor 114 and memory interface 118. Processor 114 includes a control 120 and an arithmetic logic unit (ALU) 124.

A RAM array 126 contains internal RAM 116 and external RAM 128. Internal RAM 116 provides the internal memory and working registers needed for micro controller 102. External RAM 128 provides a data store for micro-controller 102. External ROM 130 is a code store that provides a program to microprocessor 102. External ROM 130 is actually part of RAM array 126 but has its memory characteristics programmed in the memory interface 118 of FPGA 100 so that it functions as ROM. External PROM 132, and external EEPROM 134 are additional types of memory that have their memory characteristics programmed into memory interface 118. As with the ROM they are actually part of RAM array 126 but are programmed to function as PROM and EEPROM. Being able to program memory characteristics of ROM and EEPROM into memory interface 118 allows the emulator to use one RAM array and an FPGA.

Monitoring or debug logic 104 provides the logic surrounding micro-controller 102 that gives the software engineer a fully transparent window into the internal functioning of micro-controller 102. Debug interface 104 also provides the debug communications between the micro-controller 102 and computer 136. Monitoring logic 104 is programmed into FPGA 100. Computer 136 contains a source level debugging software program that cooperates with the logic in debug interface 104 to allow the software engineer to execute software code instructions in the target environment and observe the signals and timing at any point in the micro-controller. A typical debugging environment is found in the Keil dscope 51 made by Keil Elektronik GMBH in Munich Germany which is well known in the art. The preferred embodiment of the debugging program in this invention is disclosed in patent application "Micro-controller Debug Environment Integrated into Standard Business Software" to Philip Barnett and Andrew Green, filed Mar. 25, 1998 and assigned to the same assignee hereby incorporated by reference.

Figure 8:
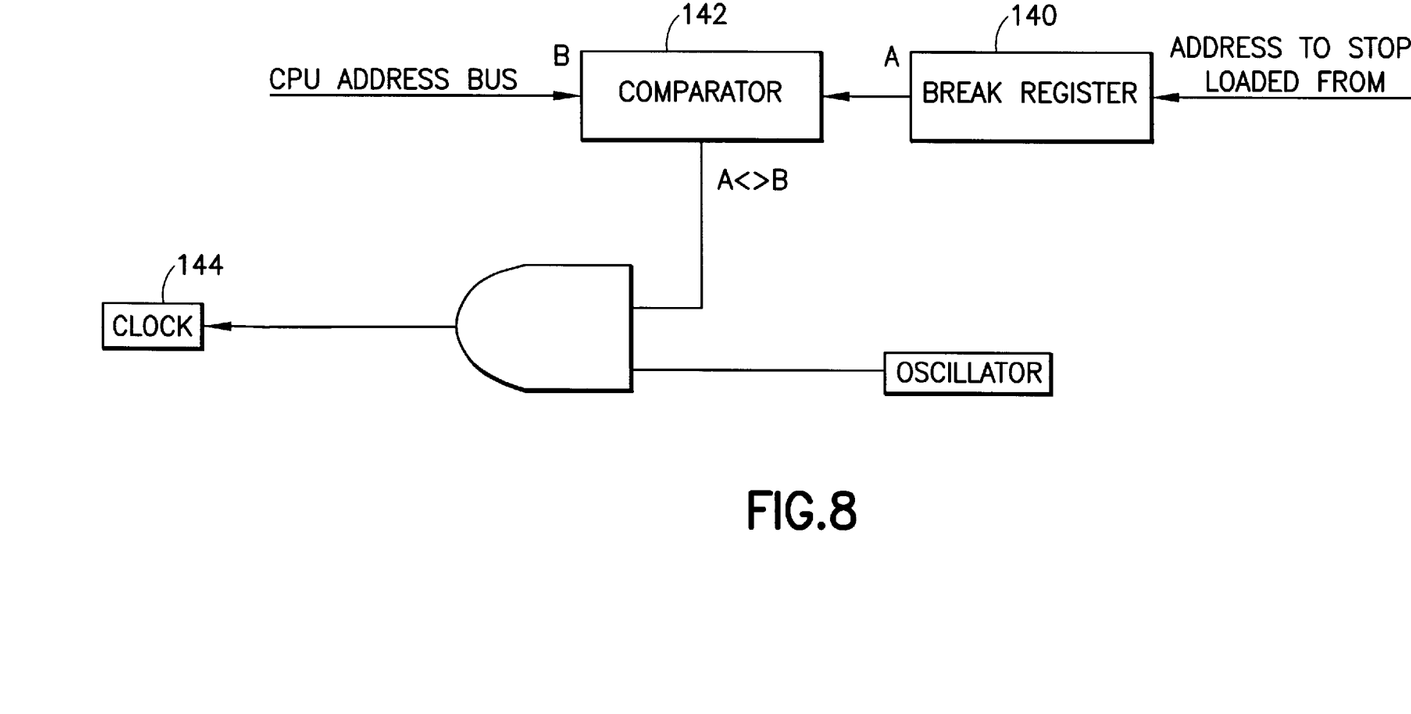
FIG. 8 is a schematic of a sample of logic in the debug logic of the emulator of FIG. 7.

FIG. 8 shows an example of the logic found in the debug interface 104. This logic fulfills the requirement to stop the processor when a certain point in code execution is reached. This means physically stopping the processor when a code fetch is made from a certain location in ROM. In FIG. 8, the break register 140 is loaded with the address where the host computer 136 (FIG. 7) wants to stop the processor. A comparator 142 compares this address with the address going to the code ROM, as long as they are different, then the micro-controller clock 144 keeps running. Once the match occurs then the clock is gated off and the micro-controller is stopped. Emulators have trace memory that stores the addresses and data values that the micro-controller has used while running. The host software can then examine this and show what happened before the break point. While the micro-controller is halted the host software via other registers connected to the busses can read and change memory, IO ports etc.

The emulator of FIG. 7 is well suited to be used with a smart card. The smart card is normally used in conjunction with a reader which has one pair of wires for communicating (i.e. a serial data line and a timing signal line) to the card reader for the smart card. This means there are limited inputs to the smart card. Therefore, the inputs to the emulator of FIG. 7 from a card reader are limited. This is in contrast to a bondout IC emulator which fits into the plug of a target CPU. The bondout IC emulator receives signals from many pins of the CPU socket which can be connected to many unsynchronized signals. The bondout based IC emulator is identical to the target CPU and can theoretically handle all of the inputs on all the pins in the same way including timing signals and asynchronous (i.e. random) signals. In contrast, the emulator programmed into the FPGA is identical to the target CPU IC logic but not in timing since the two are in different forms of silicon. The FPGA is not able to handle the timing and asynchronous signals of the signals on the pins of a target CPU. However, because a smart card receives serial data and timing data on two channels from the card reader the FPGA emulator receives the same signals and does not need to process timing and asynchronous signals. The number of channels does not need to be restricted to 2 but must be limited so that signals from the smart card (i.e. target environment) do not degrade the performance of the emulator. Limiting the number of channels can be simply achieved by synchronizing input signals with the device clock.

An additional feature of the emulator of FIG. 7 is that it can emulate a device having a number of different types of memory for example ROM 130, PROM 132, EEPROM 134. These memories are all implemented in RAM 126. The characteristics of the memory are designed into the programmable logic loaded into the memory interface 118 of emulator 100. This permits new and different memory technologies to be implemented with the same hardware. Consider the case where a device contains a mixture of memory technologies. They may vary from simple random access memory to complex non-volatile memory such as flash that requires erase before program cycles and takes a significant number of clocks cycles. This approach allows a standard device to be constructed using one technology (RAM for instance) and the characteristics of the memory being soft loaded into the programmable logic. This would allow the configuration of the device for memory block size, write time, read time and type and order of cycles.

To create the emulator of FIG. 7 in FPGA 100, VHDL source level logic descriptions of the microprocessor 102 and debug interface 104 reside in the host computer 136. The host computer then compiles the source level descriptions and loads and configures them into the field programmable gate array (FPGA). VHDL is an international standard silicon design software language, where a logic design (i.e. micro-controller) is described in text files using specific syntax. This file can then be translated in just the same way as a C computer software language is translated by a compiler, to provide a file in the format needed by the target device. A different compiler is used for different targets but each uses the same source. Translators can produce the data files needed by FPGA's, silicon simulators and silicon layout tools. This creates a microprocessor circuit 102 with the debug logic 104 in silicon. The advantage of the emulator being in silicon is that it works in real time.

Field programmable gate arrays (FPGAs) are high density ASICs that provide a number of logic resources but are designed to be configurable by a user. FPGAs can be configured in a short amount of time. FPGAs can be manufactured in high volume, reducing cost, since each user can select a unique configuration to run on the standard FPGA. The configuration of a part can be changed repeatedly, allowing for minor or even total revisions and specification changes. Other advantages of a configurable, standard part are: faster time to implement a specification and deliver a functional unit to market, lower inventory risks, easy design changes, faster delivery, and availability of second sources. The programmable nature of the FPGA allows a finished, commercial product to be revised in the field to incorporate improvements or enhancements to the specification or finished product.

While the preferred embodiments of the invention have been shown and described, numerous variations and alternative embodiments will occur to those skilled in the art. Accordingly, it is intended that the invention be limited only in terms of the appended claims.

I claim:
1. An emulator for debugging software capable of operating on a target micro-controller in a target circuit environment, said emulator comprising,
a field programmable gate array,
an emulated target micro-controller programmed into said field programmable gate array,
an emulated monitoring circuit cooperating with said emulated target micro-controller to monitor the operations of said emulated micro-controller, said emulated monitoring circuit programmed into said field programmable gate array,
said emulator receiving signals from said target circuit environment.
2. The emulator for debugging software of claim 1 in which said signals from said target circuit environment are communicated to said emulator by one or more channels, the number of channels limited so that signals from said target environment do not degrade the performance of said emulator.
3. The emulator for debugging software of claim 2 in which said one or more channels include a data channel and a timing channel.
4. The emulator for debugging software of claim 1 in which a logic description in a silicon design software language is used to program said emulated target micro-controller and said emulated monitoring circuit into said field programmable gate array.
5. The emulator for debugging software of claim 4 in which said silicon design software language is VHDL.
6. The emulator for debugging software of claim 4 including a host computer having a source program of said logic descriptions of said emulated target micro-controller and said emulated monitoring circuit, said host computer compiling said source program into said silicon design software language and reading and configuring said compiled logic descriptions of said source program into said field programmable gate array.
7. The emulator for debugging software of claim 4 including a software debug program cooperating with said emulated monitoring circuit.
8. The emulator for debugging software of claim 7 in which said host computer contains said software debug program.
9. The emulator for debugging software of claim 8 including a RAM which contains a code store program.
10. The emulator for debugging software of claim 7 including a RAM, said field programmable gate array programmed to have the characteristics of one or more types of memory, said field programmable gate array cooperating with said RAM to emulate one or more types of memory.
11. The emulator for debugging software of claim 1 including a software debug program cooperating with said emulated monitoring circuit.
12. The emulator for debugging software of claim 11 including a host computer containing said software debug program.
13. The emulator for debugging software of claim 12 or 8 including a RAM, said field programmable gate array programmed to have the characteristics of one or more types of memory, said field programmable gate array cooperating with said RAM to emulate one or more types of memory.
14. The emulator for debugging software of claim 13 in which said one or more types of memory includes ROM memory.
15. The emulator for debugging software of claim 13 in which said one or more types of memory includes PROM memory.

16. The emulator for debugging software of claim 13 in which said one or more types of memory includes EEPROM memory.

17. The emulator for debugging software of claim 12 including a RAM which contains a code store program.

18. The emulator for debugging software of claim 11 including a RAM, said field programmable gate array programmed to have the characteristics of one or more types of memory, said field programmable gate array cooperating with said RAM to emulate one or more types of memory.

19. An emulator for debugging software capable of operating on a target micro-controller in a target circuit environment, said emulator comprising, a field programmable gate array, an emulated target micro-controller programmed into said field programmable gate array, an emulated monitoring circuit cooperating with said emulated target micro-controller to monitor the operations of said micro-controller, said emulated monitoring circuit programmed into said field programmable gate array.

20. The emulator for debugging software of claim 19 in which a logic description in a silicon design software language is used to program said emulated target micro-controller and said emulated monitoring circuit into said field programmable gate array.

21. The emulator for debugging software of claim 20 in which said silicon design software language is VHDL.

22. The emulator for debugging software of claim 21 including a host computer having a source program of said logic descriptions of said emulated target micro-controller and said emulated monitoring circuit, said host computer compiling said source program into said silicon design software language and reading and configuring said compiled logic descriptions of said source program into said field programmable gate array.

23. The emulator for debugging software of claim 22 including a software debug program cooperating with said emulated monitoring circuit.

24. The emulator for debugging software of claim 23 including a RAM, said field programmable gate array programmed to have the characteristics of one or more types of memory, said field programmable gate array cooperating with said RAM to emulate one or more types of memory.

25. The emulator for debugging software of claim 22 in which said host computer contains said software debug program.

26. The emulator for debugging software of claim 25 including a RAM, said field programmable gate array programmed to have the characteristics of one or more types of memory, said field programmable gate array cooperating with said RAM to emulate one or more types of memory.

27. The emulator for debugging software of claim 25 including a RAM which contains a code store program.

28. The emulator for debugging software of claim 21 including a RAM which contains a code store program.

29. The emulator for debugging software of claim 19 including a software debug program cooperating with said emulated monitoring circuit.

30. The emulator for debugging software of claim 29 including a host computer containing said software debug program.

31. The emulator for debugging software of claim 30 including a RAM, said field programmable gate array programmed to have the characteristics of one or more types of memory, said field programmable gate array cooperating with said RAM to emulate one or more types of memory.

32. The emulator for debugging software of claim 29 including a RAM, said field programmable gate array programmed to have the characteristics of one or more types of memory, said field programmable gate array cooperating with said RAM to emulate one or more types of memory.

* * * * *

UNITED STATES PATENT AND TRADEMARK OFFICE
CERTIFICATE OF CORRECTION

PATENT NO. : 6,173,419 B1
DATED : January 9, 2001
INVENTOR(S) : Philip C. Barnett et al.

It is certified that error appears in the above-identified patent and that said Letters Patent is hereby corrected as shown below:

Column 8,
Line 29, after "is" delete "VHDL" and add -- Very High Speed Integrated Circuit Hardware Description Language (VHDL) --.

Signed and Sealed this

Thirteenth Day of May, 2003

JAMES E. ROGAN
*Director of the United States Patent and Trademark Office*